United States Patent [19]

Rice et al.

[11] Patent Number: 4,889,158

[45] Date of Patent: Dec. 26, 1989

[54] PRESSURE/FLOW COMPENSATED DIRECT ACTING PRESSURE REGULATOR

[75] Inventors: Donald D. Rice, Wylie; James C. Hawkins; Stanley D. Hall, both of Allen, all of Tex.

[73] Assignee: Fisher Controls International, Inc., Marshalltown, Iowa

[21] Appl. No.: 237,503

[22] Filed: Aug. 26, 1988

[51] Int. Cl.$^4$ .............................................. G05D 16/06
[52] U.S. Cl. .................... 137/484.4; 137/503; 137/505.12; 137/505.46; 251/212
[58] Field of Search .............. 137/484.2, 484.4, 484.6, 137/484.8, 500, 501, 503, 504, 505, 505.12, 505.13, 505.46, 613; 251/212

[56] References Cited

U.S. PATENT DOCUMENTS

| | | | |
|---|---|---|---|
| 1,893,254 | 1/1933 | Sweeney | 137/505.46 X |
| 1,913,832 | 11/1933 | Temple | 137/505.47 X |
| 2,969,142 | 1/1961 | Mack | 251/212 X |
| 3,086,548 | 4/1963 | Galiger et al. | 137/484.8 |
| 3,207,175 | 9/1965 | Pauly | 137/505.46 |
| 3,885,589 | 5/1975 | Iung | 137/613 |
| 4,491,149 | 1/1985 | Trinkwalder | 137/505.46 |
| 4,532,961 | 8/1985 | Walton et al. | 251/212 X |

FOREIGN PATENT DOCUMENTS 718097 1/1932 France ............................ 137/484.8

Primary Examiner—Stephen M. Hepperle
Attorney, Agent, or Firm—Dale A. Kubly; Nicholas A. Camasto; Arnold H. Cole

[57] ABSTRACT

A regulator valve includes a spring casing and a lower casing sandwiching a diaphragm. A cylindrical orifice tube defines an inlet and terminates short of an in-line outlet port. A one piece cam stem and relief seat is mounted for movement with the diaphragm and includes cam surfaces for directly engaging a movable disk holder. The disk holder moves in a straight line in the orifice tube and the cam surfaces move the holder at a non linear rate with respect to the diaphragm. The distal portion of the orifice tube houses a boost mechanism. A movable piston in the inlet side of the orifice tube has two pairs of spirally converging grooves on its inner surface for supporting a pair of flat gates that are rotated relative to each other to vary flow area when the piston moves responsive to differences between the inlet pressure and the pressure on the underside of the diaphragm. The distal end of the orifice tube includes an end cap and a movable deflector ring that has diametrically opposed ears projecting into cutout portions of the boost tube. The deflector ring is spring biased away from the end cap and includes flow apertures in its surface. Responsive to increased flow, the deflector is moved back against the pressure of the spring to open the cutout portions and enable flow to be diverted to the underside of the diaphragm.

17 Claims, 5 Drawing Sheets

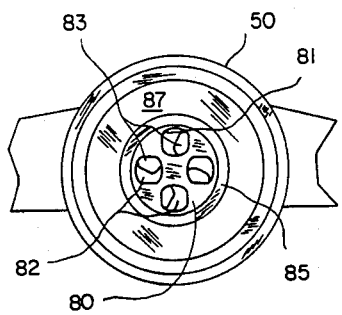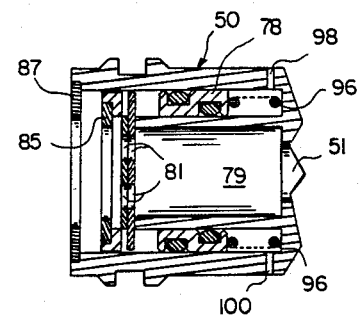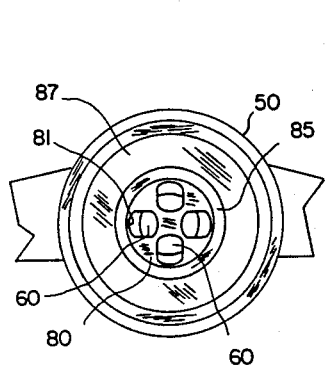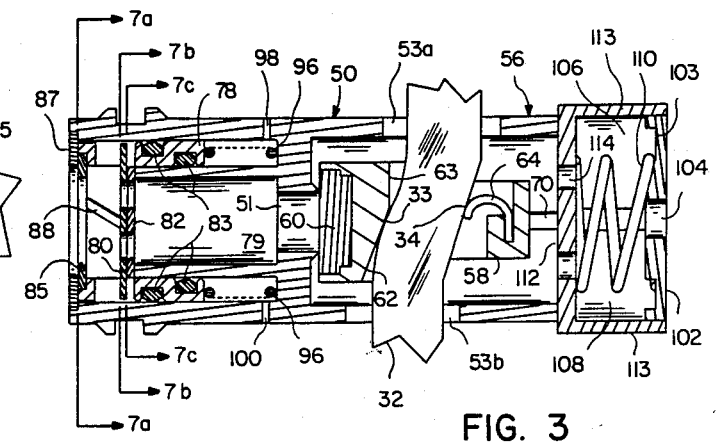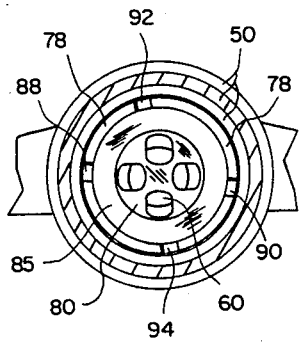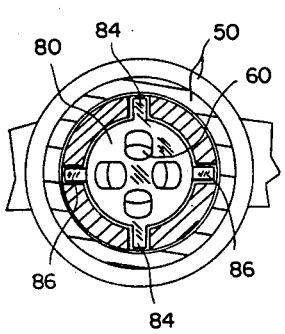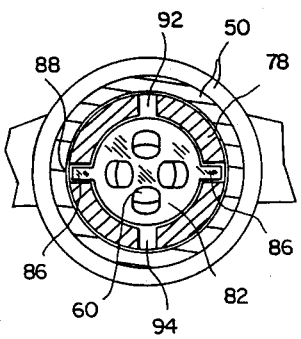

PRESSURE/FLOW COMPENSATED DIRECT ACTING PRESSURE REGULATOR

BACKGROUND OF THE INVENTION AND PRIOR ART

This invention relates generally to gas pressure diaphragm regulator valves and particularly to a gas pressure regulator valve that is usable for both natural gas and liquified petroleum gas (LP or propane) service.

Gas pressure diaphragm type regulator valves are well-known in the art. In such valves, a valve disk and a mating seat assembly are positioned intermediate to an upstream and a downstream portion of a flowpath for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator valve includes a diaphragm that acts as both the measuring and the actuation device with the downstream pressure being applied to one side of the diaphragm against the force of an opposed, adjustable regulator spring. The spring force initially holds the diaphragm and the attached stem linkage mechanism in such a position so as to have retracted the valve disk from the valve seat. As upstream pressure is introduced, gas flow occurs through the seat to the disk opening and into the downstream side of the device. The downstream pressure force is applied against the diaphragm and enables the diaphragm to overcome the opposing regulator spring force, thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm actuated by very low downstream control pressures to close the valve disk against the valve seat despite the relatively high pressure acting to push the disk open.

All single stage regulator valves experience so-called "droop" in their pressure versus flow characteristic. Droop is caused by two factors, one being the small change in the force exerted by the regulating spring due to changes in its length during travel of the diaphragm, and the other due to the fact that the effective area of the diaphragm changes slightly as the diaphragm moves. These effects combine to lower the downstream control pressure with flow increases. Hence the pressure is said to "droop." A relatively simple, inexpensive and effective partial solution is to use "velocity boosting" to apply a slightly lower pressure than the controlled downstream pressure to the diaphragm. The effect is to cause a larger valve opening and greater gas flow rates. Velocity boosting can be accomplished by a pitot tube that is positioned to sense the lower pressure at the vena contracta of the valve or by a boost tube to develop a lower pressure with increased velocity of flow in the valve chamber that communicates with the diaphragm.

It will be appreciated that in domestic gas service, the downstream pressure must be maintained at an extremely low level, on the order of 7 to 11 inches (approximately 18 to 28 centimeters) of water column pressure for natural gas and LP gas service, respectively, whereas the inlet or upstream pressure may be on the order of 60 psi (4.22 Kg per square centimeter) or more. Good pressure relief operation is required to preclude potentially serious over pressure conditions in the downstream system as well as to minimize annoying (and potentially dangerous) extinguishing of pilot lights in domestic appliances. However, the demands on gas pressure regulators, for domestic use in particular, are such that design compromises are required in the simple mechanical devices. For example, friction and hysteresis or backlash, inherent in linkage mechanisms, detract from the consistency of regulator performance. As mentioned, the spring effect and the diaphragm effect combine to cause output pressure droop. This droop will be overcome only at certain inlet pressures or across limited flow ranges by imprecise velocity boosting techniques. The fixed mechanical advantage linkage mechanisms do nothing to overcome droop. In many current examples of the art, the relief valve is contained in an actuator housing which is separated from the body that houses the valve seat, forcing overpressured downstream gas to flow through restricting passages before reaching the relief valve for venting.

The gas pressure regulator valve described and claimed in U.S. application Ser. No. 161,860, filed 2/29/88, entitled DROOP COMPENSATED DIRECT ACTING PRESSURE REGULATOR in the names of D. Rice and M. Hood and assigned to Fisher Controls International, Inc. overcomes the above limitations. This application issued June 27, 1989 U.S. Pat. No. 4,842,013. It utilizes a combination of a characterized cam stem and an orifice tube which is a valve seat with an integral boost tube. The characterized or contoured cam stem has a cam profile that is directly operable by the regulator spring and diaphragm for moving a valve disk in a straight line into and out of engagement with a valve seat in a nonlinear fashion, without the intervention of a linkage mechanism. The cam stem provides a high mechanical advantage when required to close the valve disk against the seat, yet exhibits a low mechanical advantage to achieve rapid, nonlinear opening of the valve disk to mechanically induce a boost effect and to maintain the desired downstream control pressure in 11 flow situations. The orifice tube aids in the uniformity of regulation by inducing flow activated boost as its configuration determines the space between the end of the tube and the valve outlet which in turn controls aspiration of the diaphragm cavity, which is the downstream pressure measuring element of the regulator. The arrangement also permits the diaphragm to be exposed to a large volume flow chamber, and in conjunction with a large area relief seat on the cam stem, provides excellent over pressure protection or relief performance.

The improved compensated direct acting pressure regulator of the present invention has two specific aspects in addition to those characteristics described in the direct acting pressure regulator of the above-mentioned copending application. Both aspects of the invention are directed to obtaining maximum flow performance at low inlet pressures while preventing excessive flow at high inlet pressures for maximizing regulator performance and safety. In the first aspect of the invention, a pair of inlet gates are adjusted to reduce the inlet flow area with increasing inlet pressure and in the second aspect of the invention, a movable deflection ring is provided in the boost tube for reducing boost under increased flow conditions and enabling more pressure to be applied to the relief device in the event of failure. Either or both of these inventive aspects may be used in combination with the direct acting pressure regulator of the copending application to achieve a regulator of improved performance, reliability and safety.

OBJECTS OF THE INVENTION

A principal object of the invention is to provide a novel gas pressure regulator valve.

Another object of the invention is to provide a low cost, high performance, direct acting, single stage gas pressure regulator valve.

A further object of the invention is to provide an improved single stage gas pressure regulator valve.

A feature of the invention is a pair of inlet gates that are movable in response to inlet pressure to change the inlet flow area.

Another feature of the invention is a movable deflection ring in a boost tube that is movable in response to flow to vary the boost effect and to improve relief performance.

BRIEF DESCRIPTION OF THE DRAWINGS

These and other objects and advantages of the invention will be apparent upon reading the following description in conjunction with the drawings, in which:

FIG. 3 is an enlarged partial sectional showing of the features, i.e., the characterized cam stem, boost tube, linearly movable disk holder, inlet pressure responsive piston and gates and boost altering deflection ring of the regulator valve of the invention;

FIG. 4 is a left elevation of the structure of FIG. 3;

FIG. 5 is a partial top sectional view of the arrangement of FIG. 3;

FIG. 6 is a left elevation of the structure of FIG. 5;

FIGS. 7a, 7b and 7c are partial views taken along the lines 7a—7a, 7b—7b and 7c—7c, respectively, in FIG. 3;

DESCRIPTION OF THE PREFERRED EMBODIMENT

Figure 1:
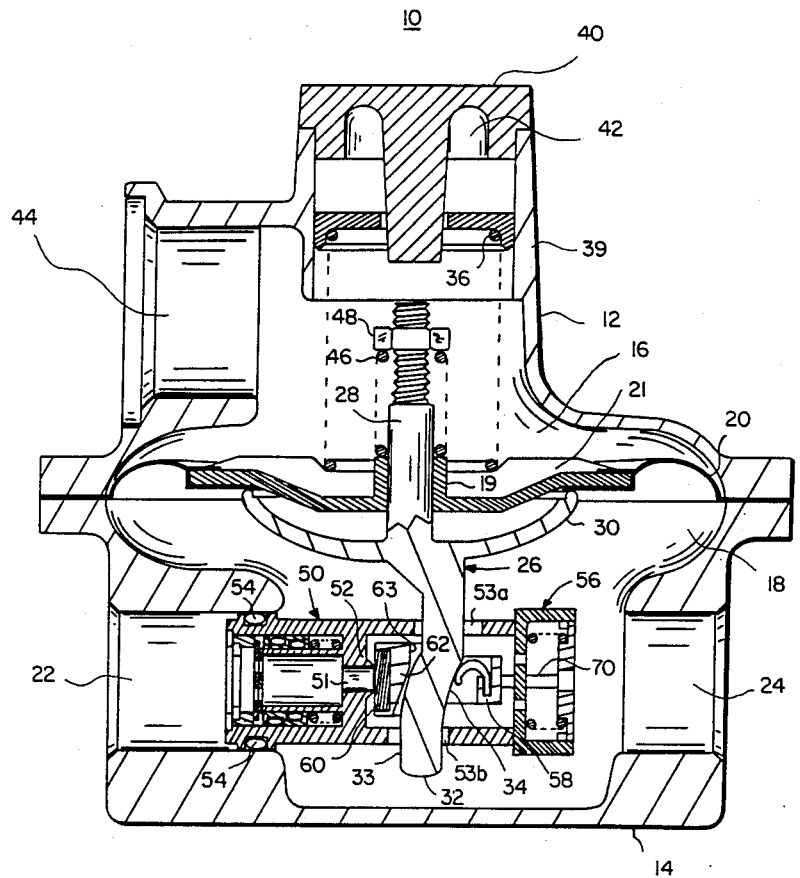
FIG. 1 is a cross section of a regulator valve constructed in accordance with both aspects of the invention.

Referring to FIG. 1, a regulator valve 10 includes a spring casing 12 that is assembled onto a regulator valve body or lower casing 14 by any conventional means. For example, the casings may include mating flanges along their peripheries that are secured together by suitable threaded fasteners and mating threaded apertures. These details are not illustrated. Spring casing 12 defines an upper chamber 16 and valve body 14 defines a lower chamber 18 of large volume. Separating these two chambers is an elastomeric, generally annular diaphragm 20 that is affixed to a large diameter diaphragm head 21. The circular, outer periphery of diaphragm 20 is captivated between the flanges of spring casing 12 and valve body 14. In any suitable manner, the inner peripheral portion of diaphragm 20 is affixed to the outer periphery of diaphragm head 21. Diaphragm head 21 has a centrally disposed, upstanding cylindrical collar 19. As will be appreciated by those skilled in the art, diaphragm head 21 is not solid, but defines a plurality of large apertures that in normal operation are sealed by a large area, generally cup-shaped, relief seat 30 that is an integral part of a cam stem 26. The relief seat may, of course, simply be affixed to cam stem 26. Cam stem 26 includes a cylindrical post 28 that terminates in a threaded end. Collar 19 of diaphragm head 21 is slidably mounted on post 28. Pressure is applied to seal the underside of diaphragm 20 with relief seat 30 by an adjustable relief spring 46 captivated between diaphragm head 21 and an adjustment nut 48 that threadingly engages the threaded end of post 28. Relief spring 46 is adjusted such that, for normal operating pressures, diaphragm head 21 does not move relative to cam stem 26 and consequently relief seat 30 remains in engagement with the underside of diaphragm 20.

When the diaphragm and relief seat are engaged, there is no path from valve body 14 to spring casing 12. When an over pressure condition exists such that diaphragm head 21 is driven upward with respect to cam stem 26, the seal between diaphragm 20 and relief seat 30 is broken and gas flow occurs from lower chamber 18 around relief seat 30 and through large orifices (not shown) in the body of diaphragm head 21, to upper chamber 16.

The upper portion of spring casing 12 is closed by a closing cap 40. An adjustable regulator spring 36 is captivated between diaphragm head 21 and an upper adjustable spring seat 39 mechanism that is vertically displaceable for increasing or decreasing the force exerted by regulator spring 36 on the diaphragm head. Cap 40 includes a downwardly projecting travel stop 42 to limit the upward movement of cam stem 26 to force the regulator into relief operation in the event of catastrophic failure of the valve mechanism both to close in response to a cessation of gas demand and also to fail to relieve the resulting over pressure through normal relief operation. Spring casing 12 also defines a relief vent 44 by means of which upper chamber 16 communicates with the external environment.

Regulator valve body 14 includes an inlet port 22 and an outlet port 24 that are threadingly engageable for connection of the regulator valve in a pipeline (not shown) in which gas flows. Inlet port 22 and outlet port 24 are preferably axially aligned as shown to provide a relatively straight through flowpath for the gas in the pipeline. Cam stem 26 terminates in a stem end 32 having a front cam profile surface 33 and a similarly contoured rear cam profile surface 34. Stem end 32 extends through generally rectangular openings 53a and 53b in a cylindrical orifice tube 50 that has a length that extends over a substantial portion of the distance between inlet port 22 and outlet port 24. Orifice tube 50 is secured in valve body 14 and forms a gas tight seal with the inner wall of inlet port 22 by means of an O ring 54 and forms a circular valve seat 52. As thus described, the regulator valve is substantially that disclosed and claimed in the above-entitled copending application. The inlet pressure and boost flow improvements of the present invention will now be described.

Figure 2:
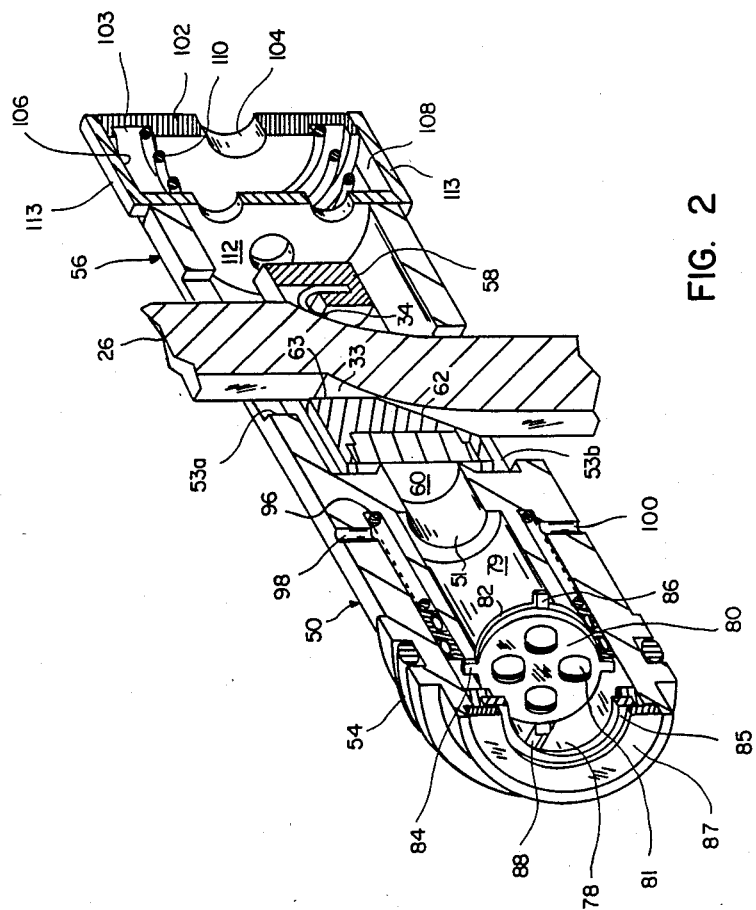
FIG. 2 is an enlarged partially cutaway perspective view of the inventive arrangement of FIG. 1.

Referring particularly to FIGS. 1, 2 and 3, the forward portion or inlet end of orifice tube 50 includes an inner cylindrical tube 79 about which a cylindrical piston 78 is linearly movable. The piston moves between the outer surface of cylinder 79 and the inner surface of orifice tube 50 and pressure seals between the piston and these surfaces are provided by a pair of O rings 83. One O ring is located in a suitable groove on the outside of the piston 79 and forms a seal with the inner surface of orifice tube 50 and the other O ring is located in a groove on the inside of piston 78 and creates a seal with the outer surface of cylinder 79. A compression spring 96 urges piston 78 toward the front or inlet side of orifice tube 50. The top, or inlet side, of piston 78 includes four spiral slots (86, 88, 92 and 94) that begin at the bottom of the piston 90 degrees apart and spiral toward its top. Each pair of slots are 180 degrees apart, with one pair spiralling in a clockwise direction and the other pair spiralling in a counterclockwise direction. One or more registration holes 98 and 100, for example, expose the bottom of the piston to pressure in the lower chamber 18 of valve body 14 whereat the top of the piston is exposed to inlet pressure. The O rings 83 isolate the inlet pressure at the top of the piston from the downstream regulated pressure at the bottom of the piston.

A pair of flat, circular inlet gates 80 and 82 (see also FIGS. 13 and 14) each having four matching flow orifices 81 is positioned in the front of piston 78. Each inlet gate has a pair of opposed ears that are captivated in a respective one of the two pair of spiral slots on the inner surface of piston 78. The top of piston 78 has an undercut portion in which a retainer ring 85 is located and similarly, the forward end of orifice tube 50 has an undercut portion in which a retainer ring 87 is mounted.

In FIGS. 3 and 4, the orifices 81 in gates 80 and 82 are in alignment and maximum flow area is provided for the orifice tube 50. In FIGS. 5 and 6, on the other hand, the inlet gates 80 and 82 have been rotated relative to each other (by movement of piston 78, as will be explained) and minimum flow area is provided for orifice tube 50.

FIGS. 7a–7c indicate more clearly the positioning of the inlet gates in the slots when piston 78 is in its full forward position, corresponding to maximum inlet flow area.

Figure 13:
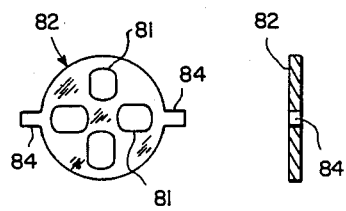
FIG. 13 shows one of the inlet gates.
Figure 14:
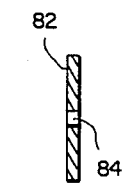
FIG. 14 is an end view of the gate of FIG. 13.

Details of piston 78 are best seen in FIGS. 8–12 and details of the inlet gates are seen in FIGS. 13 and 14. The two inlet gates 80 and 82 are identical and are orientated 90 degrees with respect to each other in their full open position. Thus, one gate (82) is positioned with its ears in a generally horizontal plane and the other gate (80) is positioned with its ears in a generally vertical plane. The actual positioning is immaterial, as will be readily recognized. Because of the converging arrangements of the pairs of slots 86–88 and 92–94, movement of the inlet gates 80 and 82 and the piston 78 relative to each other, will result in the inlet gates 80 and 82 being rotated in opposite directions to vary the flow openings defined by the orifices 81 therein. As mentioned, the amount of movement of piston 78 depends upon the pressure (force) differential that exists between its top and its bottom. The pressure at its top is the inlet pressure, whereas the pressure at its bottom is a combination of the regulated pressure and the force exerted by spring 96. It will be appreciated that the inlet pressure is such that gates 80 and 82 are always positioned against the open end of inner cylinder 79. Consequently, movement of piston 78 causes the inlet gates 80 and 82 to rotate relative to each other as their respective ears are driven by the spiral slots on the inner surface of the piston.

Figure 9:
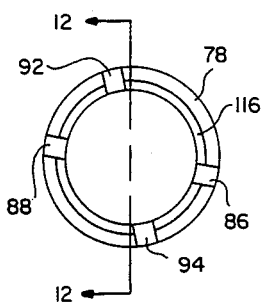
FIG. 9 is a left elevation of the piston of FIG. 8.
Figure 8:
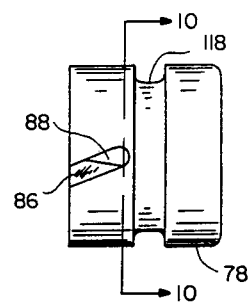
FIG. 8 is a side elevation of an inlet piston constructed in accordance with the invention.
Figure 10:
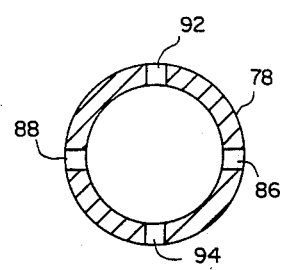
FIG. 10 is a view of FIG. 8 taken along the line 10—10.
Figure 12:
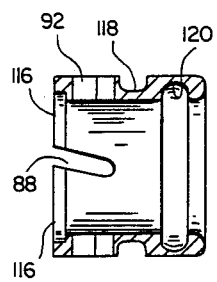
FIG. 12 is a sectional view of the piston taken along the line 12—12 of FIG. 9.
Figure 11:
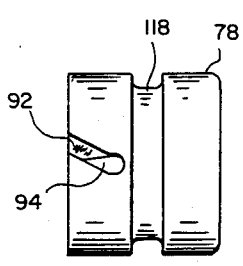
FIG. 11 is a bottom view of the piston of FIG. 8.

Noting particularly FIG. 9, slot pair 86–88 and slot pair 92–94 are not at right angles to each other. When the inlet gates are at the top of the piston the angle between them will be less than 90 degrees and they will be substantially closed, that is the orifices 81 will not be in alignment with each other. Consequently, flow through the orifice 81 (and flow through orifice tube 50) will be significantly restricted. This is best illustrated in FIGS. 5 and 6. In FIG. 5, which shows the high inlet pressure or closed position of the inlet gates, the force on piston 78 has moved it to compress spring 96. In moving to its back position, the grooves in piston 78 cause inlet gates 80 and 82 to be oppositely rotated and to reduce the flow area through orifices 81. This is best shown in FIG. 6 where the displaced orifices 81 in inlet gates 80 and 82 permit only small flow areas 83. This is in contrast to the open position shown in FIGS. 3 and 4, where piston 78 is at its front position and inlet gates 80 and 82 are at the base of the slots and positioned at right angles to each other. In this low inlet pressure position, orifices 81 in gates 80 and 82 are in substantial alignment and maximum flow area is produced in orifice tube 50.

Reverting to FIGS. 1, 2 and 3, orifice tube 50 includes a boost extension 56 for providing a velocity boost effect to gas flow therethrough to produce, by aspiration of the lower chamber by the flow velocity, a slightly lower pressure on the underside of diaphragm 20 than that which is present at outlet port 24.

As fully described in the above-mentioned copending application, a valve disk 60 is carried by a disk holder 58 that is horizontally movable within orifice tube 50 in response to vertical movement of cam stem 26. This is due to cam follower surfaces 62 and 63 on disk holder 58 that are engageable with front cam surface 33 on stem end 32. Disk holder 58 is confined to straight line axial movement within orifice tube 50 by means of a pair of slots 68 and 70 in the orifice tube (see FIG. 15). A bias spring 64 engages rear cam surface 34 of stem end 32 and serves to assist in overcoming hysteresis effects in valve operation. The underside of diaphragm 20 is substantially in direct communication with the flowpath between inlet port 22 and outlet port 24 and, in conjunction with the large relief seat 30, enables fast, effective over pressure relief operation in the event of a sudden increase in the outlet or downstream pressure.

Valve disk 60 is preferably constructed of a resilient material such as synthetic rubber, and maintained in a suitable recess in the forward end of disk holder 58. Disk holder 58 is generally cylindrical in shape with a cutout portion defining a pair of inner parallel side walls and a rear wall, and a forward wall that is defined by cam follower surfaces 62 and 63. Four extensions or wings 57, two on each side of the disk holder 58, ride in slots 68 and 70. First and second mounting ears 55 are formed at the forward end of orifice tube 50 and include mounting apertures 55a for mounting the orifice tube securely within lower casing 14 of the regulator valve.

The cam follower surfaces 62 and 63 cooperate with front cam profile 33 on cam stem 26 to move disk holder 58 and thereby control the flow opening between valve seat 52 and valve disk 60. The contour of cam surface 33 and the cam follower surfaces 62 and 63 provide approximately a 4:1 force advantage to facilitate firm closure of the valve disk when necessary, which tapers to approximately a 2:1 mechanical advantage to facilitate regulation stability and capacity during flow conditions. The curved end of bias spring 64 rides along cam surface 34 and continually urges cam surface 33 into engagement with the involved one of cam follower surfaces 62 and 63, which eliminates some of the hysteresis effect and contributes to the very consistent performance of the regulator with load cycling and inlet pressure changes.

Figure 15:
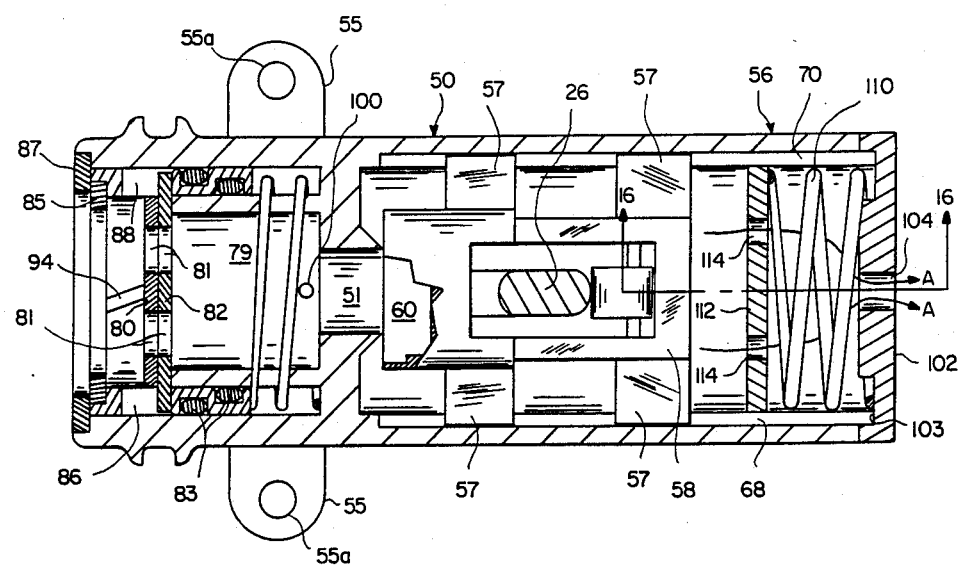
FIG. 15 is an enlarged plan view of the structure of FIG. 3.
Figure 17:
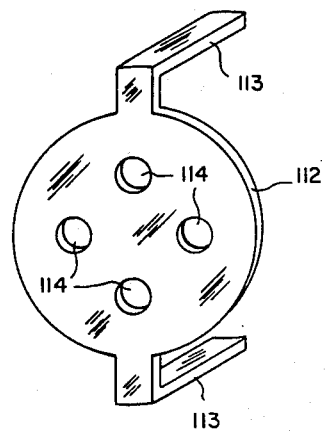
FIG. 17 is a perspective view of the movable deflection ring.
Figure 16:
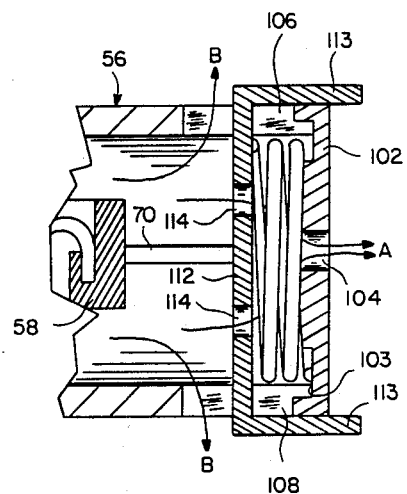
FIG. 16 is a partial sectional view taken along the line 16—16 of FIG. 15 showing the deflection ring in its fully activated position.

With further reference to FIGS. 15-17, the boost modulating aspect of the invention will be described. The rearward extension of orifice tube 50 comprises a boost tube 56 that is cylindrical and closed at its end by a generally circular cap 102. An annular groove 103 is formed in the inner surface of cap 102 and cooperates with an undercut in the end of boost tube 56 for securing cap 102 thereto. The exact mechanism by which end cap 102 is secured to the end of boost tube 56 is not important and a snap fit may be employed. A deflection ring 112, having a pair of diametrically opposed ears with deflection hole cover extensions 113, is mounted for axial movement within boost tube 56 against the urging of a spring 110. Deflection ring 112 includes four circular apertures 114 in its surface for permitting flow therethrough. The deflection ring ear extensions 113 cover a pair of cutouts 106 and 108 in boost tube 56 and override end cap 102, as shown.

As best seen in FIG. 2, as flow through orifice tube 50 increases, the pressure on deflection ring 112 forces it to move rearwardly against the force of spring 110. In moving, the deflection ring 112 exposes the forward portions of cutouts 106 and 108, within which ear extensions 113 are movable, thereby permitting gas flow to be diverted from orifice tube 50 to lower chamber 18. The arrangement of movable deflection ring 112 and cutouts 106 and 108 form a flow diverter means for diverting flow from orifice tube 50 to chamber 18. Gas that is diverted from boost tube 56 to chamber 18 communicates directly with the underside of diaphragm 20 and thus reduces the boost effect. Consequently, as gas flow through orifice tube 50 increases, deflection ring 112 is moved back and the boost effect decreases. An orifice 104 in end cap 102 permits low volume gas flow to pass through the regulator valve in normal fashion.

To recapitulate, the basic direct acting regulator valve performs substantially as disclosed in the aforementioned copending application. The inlet side improvement of the present invention comprises a pair of inlet gates that are caused to rotate with respect to each other by movement of a piston in response to differences in the inlet and the regulated pressures. Other types of pressure responsive variable area restrictions are also contemplated such as a single movable gate or plug operating in conjunction with a fixed orifice. A spring at the bottom of the piston balances the force of the pressure differential to control the piston travel distance. At zero or very low inlet pressures, the spring urges the piston forward and results in alignment of the apertures in the inlet gates to allow full flow area. (Alignment of the gates occurs because they are at the base of the grooves in the piston where the grooves are situated at 90 degrees to each other.) As the inlet pressure increases, the force on the top of the piston overcomes the spring force on its bottom and the piston is pushed farther into the orifice tube. The inlet gates are precluded from linearly moving with the piston by the inner wall of the cylindrical tube (on which the piston rides) in the orifice tube. They therefore are rotated in opposite directions, following the spiral slots in the piston. As the inlet gates rotate, the apertures therein are "closed down" to reduce the flow area.

The benefits flowing from this aspect of the invention are that at high inlet pressures, the inlet flow area is reduced, resulting in safer operation in the event of an overpressure condition because a smaller amount of gas needs to be relieved to keep the downstream pressure low. The ultimate capacity of the regulator valve is thus limited under high inlet pressure conditions which provides a further measure of operational safety in the event of a failure in a downstream system such as a rupture in a downstream line. There is also a tendency to limit any "over boost" condition in the downstream control pressure that could result from an excessively high flow rate and high inlet pressure. An additional advantage is that the inlet flow control permits a manufacturer to supply fewer different types of regulator configurations to cover a broad range of user applications. Further, the inlet gate mechanism is completely independent of the primary regulator control elements.

With respect to the boost aspect of the present invention, the deflection ring is flow responsive. The impact force of the gas flow against the deflection ring moves the deflection ring against the known force of a compression spring. As with the inlet side, the spring controls the amount of travel for the deflection ring and provides for its return when flow conditions stabilize. Under normal low volume flow conditions, the gas moves freely through the boost tube and through the apertures in the deflection ring and through the aperture in the boost tube end cap. As gas flow in the orifice tube increases, the deflection ring becomes a substantial obstruction. The force developed on the deflection ring ultimately overcomes the spring force and moves the deflection ring back to expose portions of cutouts in the boost tube which allows gas to flow directly from the orifice tube into the lower valve chamber. Boost is thus reduced. The arrangement also enhances the valve's ability to provide pressure and gas flow for relief purposes in the event of a system failure.

As flow moves through the orifices in the deflection ring, a pressure drop is developed on the rearward side of the deflection ring. This force moves the deflection ring closer to the end cap and tends to close off the end of the orifice tube and to reroute the gas flow into the lower chamber. Limited gas flow is maintained through the orifice in the end cap. One skilled in the art will recognize that the size of the end cap orifice may be changed or that it may be completely closed off, depending upon the application requirements. A decrease in gas flow results in the deflection ring being moved back to its normal position by the spring, which reestablishes the normal flow path and boost conditions for the regulator.

The advantages associated with the boost modulation mechanism of the invention are similar to those for the inlet flow control mechanism. Under high flow conditions the flow is diverted from the boost tube to improve the relief performance as a greater volume of gas is allowed to affect conditions at the underside of the diaphragm. Therefore, high flow rates and high inlet pressures are precluded from developing an over boost condition. Maximum boost during low flow conditions (extremely low inlet pressures) is provided with this feature and the structure is independent of the operation of the main valve mechanism.

It is contemplated that the regulator may advantageously incorporate the inlet pressure response characteristics of the invention in combination with the direct acting regulator mechanism. It is also contemplated that the flow activated boost modulation characteristics of the invention be used in conjunction with the direct acting regulator mechanism. In some applications, the benefits of both aspects of the invention may be obtained, thus it is also contemplated that both the inlet pressure and flow control boost modulation features may be employed in a single regulator valve. Indeed, the invention enables a manufacturer to offer a standard direct acting droop compensated regulator with selected trim packages that include either or both of the inventive features for adapting to various use conditions.

The regulator is preferably constructed of light weight, but strong materials in keeping with its cost-design objective. The cam stem, orifice tube and disk holder may be fabricated of engineering resins of inherently high self-lubricity or the like to provide light weight, strength and low friction. The diaphragm may be fabricated from any well-known elastomeric materials utilized for such purposes. The cam stem and relief seat are preferably molded in a single piece. Similarly, the valve seat may be a separate insert or, as shown, integrally formed as part of the orifice tube. As should be apparent to those skilled in the art, changing the diameter of the orifice in valve seat 52 and the configuration of the various cam surfaces as well as altering the length and size of orifice tube 50 in conjunction with either or both of the inlet pressure or boost modulation aspects of the present invention will enable a manufacturer to provide a safe, reliable, single stage, low cost gas pressure regulator valve to meet a wide range of environmental and operating conditions.

It is recognized that numerous modifications in the described invention will be apparent to those skilled in the art without departing from its true spirit and scope. The invention is to be limited only as defined in the claims.

What is claimed is:

1. A regulator valve having an inlet and an outlet comprising:
   diaphragm means;
   means applying a regulating force to one side of said diaphragm means;
   orifice tube means defining said inlet and providing flow communication to said outlet;
   valve means in said orifice tube means operable responsive to said diaphragm means for controlling flow through said orifice tube means to said outlet;
   boost means communicating with said orifice tube means for applying pressure to the other side of said diaphragm means; and
   flow control means, including variable gate means in said orifice tube means upstream of said valve means, for varying the flow area of said orifice tube means as a function of the difference between pressure at said inlet and the pressure on said other side of said diaphragm means.

2. The regulator valve of claim 1 wherein said variable gate means includes movable piston means and a pair of inlet gates each having flow orifices therethrough, said movable piston means being moved by said difference in pressures to adjust said inlet gates and to vary the size of said flow orifices.

3. The regulator valve of claim 2 wherein said movable piston means include a cylindrical piston having pairs of converging spiral grooves on its inner surface and wherein said inlet gates are flat and include ears that are engageable in said spiral grooves for rotating said gates relative to each other as said piston moves.

4. The regulator valve of claim 3 wherein said orifice tube means includes an inner cylindrical portion over which said movable piston is movably mounted;
   seal means between said piston and said orifice tube means and between said piston and said inner cylindrical portion;
   a spring for urging said piston toward said inlet; and
   a registration orifice for subjecting the rear of said piston to pressures on said other side of said diaphragm means.

5. A regulator valve having an inlet and an outlet comprising:
   a diaphragm;
   means applying a regulating force to one side of said diaphragm;
   an orifice tube forming said inlet and providing flow communication to said outlet;
   valve means in said orifice tube movable responsive to said diaphragm means for controlling flow in said orifice tube;
   a boost tube communicating with said orifice tube for applying pressure to the other side of said diaphragm means;
   movable piston means in said orifice tube adjacent said inlet, said piston including seal means for isolating inlet pressure from pressure on said other side of said diaphragm and having converging spiral grooves on its inner surface;
   a pair of flat circular gates each including flow orifices and extending ears engageable in said spiral grooves for rotationally moving said gates relative to each other to vary the area defined by said orifices as said piston is moved; and
   spring means for urging said piston toward said inlet.

6. A regulator valve having an inlet and an outlet comprising:
   diaphragm means;
   means applying a regulating force to one side of said diaphragm means;
   orifice tube means defining said inlet and providing flow communication to said outlet;
   valve means in said orifice tube means and including a stationary valve seat and movable valve disk means movable in a straight line into and out of engagement with said valve seat;
   stem means coupled to said diaphragm means and having a cam profile for adjusting the position of said valve disk means with respect to said valve seat responsive to movement of said diaphragm means;
   boost means communicating with said orifice tube means for applying pressure to the other side of said diaphragm means; and
   flow control means in said orifice tube means, including variable gate means upstream of said stationary valve seat, for varying the flow through said orifice tube means as a function of the difference between the pressures at said inlet and that applied to said other side of said diaphragm means.

7. The regulator valve of claim 6 wherein said flow control means comprises a movable piston means supported by said orifice tube means and including a pair of gates movable with respect to each other by movement of said piston means to vary the flow area in said orifice tube means.

8. The regulator valve of claim 7 wherein said movable piston means includes two pairs of converging spiral grooves on the inner wall thereof and wherein said gates include a pair of ears extending therefrom and engaging said respective pairs of said spiral grooves.

9. A regulator valve having an inlet and an outlet comprising:
    diaphragm means;
    means applying a regulating force to one side of said diaphragm means;
    orifice tube means defining said inlet and providing flow communication to said outlet;
    valve means in said orifice tube means operable responsive to said diaphragm means for controlling flow through said orifice tube means to said outlet;
    boost tube means terminating said orifice tube means, for applying pressure to the other side of said diaphragm means;
    flow diverter means for changing the effect of said boost tube means as a function of flow through said orifice tube means; and
    said flow diverter means comprising aperture means in the wall of said boost tube means and a movable deflector in said boost tube means for diverting flow through said aperture means to said other side of said diaphragm means.

10. The regulator valve of claim 9 wherein said boost tube means includes an end cap;
    wherein said aperture means comprises a pair of cutouts near said end cap; and
    wherein said movable reflector is movable within said boost tube means and includes a pair of ear means movable within said cutouts and normally covering said cutouts.

11. The regulator valve of claim 10, further including a spring between said end cap and said movable deflector.

12. The regulator valve of claim 11, further including flow apertures in said movable deflector.

13. The regulator valve of claim 12 wherein said end cap includes a flow aperture.

14. A regulator valve having an inlet and an outlet comprising:
    diaphragm means;
    means applying a regulating force to one side of said diaphragm means;
    orifice tube means defining said inlet and providing flow communication to said outlet;
    valve means in said orifice tube means operable responsive to said diaphragm means for controlling flow through said orifice tube means to said outlet;
    boost means communicating with said orifice tube means for applying pressure to the other side of said diaphragm means;
    flow control means for varying the flow area of said orifice tube means as a function of the difference between pressure at said inlet and pressure applied to said other side of said diaphragm means; and
    boost modulating means for reducing the effect of said boost means as a function of flow through said orifice tube means.

15. The regulator valve of claim 14 wherein said flow control means comprises a movable piston in the inlet side of said orifice tube means carrying a pair of inlet gates, each including flow orifices, said piston being movable by differences in pressure between said inlet and said other side of said diaphragm means to move said inlet gates to vary the relative positions of said flow orifices in said inlet gates; and
    wherein said boost modulating means comprises a movable deflector in the other end of said orifice tube means diverting flow from said orifice tube means to said other side of said diaphragm means, said orifice tube means including an end cap and a pair of cutouts and said movable deflector having a pair of ear means being movable within said cutouts and normally covering said cutouts.

16. The regulator of claim 15 wherein said piston is cylindrical and includes converging spiral grooves on its inner surface and wherein said inlet gates are flat and include ears engageable in said spiral grooves for rotating said gates relative to each other as said piston moves.

17. The regulator valve of claim 16, further including:
    first spring means are provided for urging said piston to the inlet side of said orifice tube means; and
    second spring means for urging said movable deflector away from said end cap.

* * * * *

UNITED STATES PATENT AND TRADEMARK OFFICE
CERTIFICATE OF CORRECTION

PATENT NO. : 4,889,158

DATED : December 26, 1989

INVENTOR(S) : Donald D. Rice, James C. Hawkins and Stanley D. Hall

It is certified that error appears in the above-identified patent and that said Letters Patent is hereby corrected as shown below:

Column 2, line 47, delete "11", insert --all--.

Signed and Sealed this

Sixteenth Day of October, 1990

Attest:

HARRY F. MANBECK, JR.

*Attesting Officer*  *Commissioner of Patents and Trademarks*